United States Patent
Mueller et al.

(10) Patent No.: US 9,228,901 B2
(45) Date of Patent: Jan. 5, 2016

(54) OPTICALLY VARIABLE ENTITY AUTHENTICATING DEVICE AND METHOD

(71) Applicant: SICPA HOLDING SA, Prilly (CH)

(72) Inventors: Edgar Mueller, Lausanne (CH); Pierre Degott, Crissier (CH); Claude-Alain Despland, Prilly (CH)

(73) Assignee: SICPA HOLDING SA, Prilly (CH)

( * ) Notice: Subject to any disclaimer, the term of this patent is extended or adjusted under 35 U.S.C. 154(b) by 9 days.

(21) Appl. No.: 14/347,141

(22) PCT Filed: Sep. 26, 2012

(86) PCT No.: PCT/EP2012/004034
§ 371 (c)(1),
(2) Date: Mar. 25, 2014

(87) PCT Pub. No.: WO2013/045082
PCT Pub. Date: Apr. 4, 2013

(65) Prior Publication Data
US 2014/0233033 A1    Aug. 21, 2014

(30) Foreign Application Priority Data

Sep. 26, 2011 (EP) .................................. 11182728
Nov. 8, 2011 (EP) .................................. 11008888

(51) Int. Cl.
*G01J 3/46* (2006.01)
*G07D 7/00* (2006.01)
(Continued)

(52) U.S. Cl.
CPC ................. *G01J 3/46* (2013.01); *G07D 7/0046* (2013.01); *G07D 7/121* (2013.01); *G07D 7/128* (2013.01); *G07D 7/2066* (2013.01)

(58) Field of Classification Search
CPC ................. G01J 3/46; G01J 3/50; G01J 3/02; G01J 3/524; G01J 3/51; G01N 21/00
USPC .................................................. 356/300–445
See application file for complete search history.

(56) References Cited

U.S. PATENT DOCUMENTS

| 4,705,300 A | 11/1987 | Berning et al. |
| 4,705,356 A | 11/1987 | Berning et al. |

(Continued)

FOREIGN PATENT DOCUMENTS

| DE | 197 29 918 | 1/1999 |
| DE | 100 23 004 | 11/2001 |

(Continued)

OTHER PUBLICATIONS

Australian Examination Report conducted in counterpart Australian Appln. No. 2012314907 (Apr. 2, 2015).

*Primary Examiner* — Abdullahi Nur
(74) *Attorney, Agent, or Firm* — Greenblum & Bernstein, P.L.C.

(57) ABSTRACT

Disclosed is a device for the authentication of an optically variable entity exhibiting a color shift with changing viewing-angle, the device comprising a plate of light-refractive material, said plate having two surfaces and an array of light-refracting protrusions or recesses on at least one of said surfaces, and being disposed in said device such as to provide, aside each other, a direct view and a view through said plate onto at least parts of said optically variable entity, said view through said plate being an angularly deflected view, resulting from light refraction at said protrusions or recesses. Further disclosed is a method for authenticating an optically variable entity, as well as the use of a plate having two parallel surfaces and an array of positive or negative light-refracting protrusions or recesses on at least one of said surfaces for authenticating an optically variable entity.

12 Claims, 5 Drawing Sheets

(51) Int. Cl.
   *G07D 7/12*    (2006.01)
   *G07D 7/20*    (2006.01)

(56) References Cited

U.S. PATENT DOCUMENTS

| | | | |
|---|---|---|---|
| 4,721,217 | A | 1/1988 | Phillips et al. |
| 5,279,657 | A | 1/1994 | Phillips et al. |
| 5,596,402 | A | 1/1997 | Markantes et al. |
| 6,473,165 | B1 | 10/2002 | Coombs et al. |
| 7,262,856 | B2 * | 8/2007 | Hobbs et al. ............ 356/436 |
| 2002/0191175 | A1 | 12/2002 | Coombs et al. |
| 2004/0132172 | A1 * | 7/2004 | Cunningham et al. ..... 435/287.2 |
| 2005/0217969 | A1 | 10/2005 | Coombs et al. |
| 2007/0201116 | A1 | 8/2007 | Wicker et al. |

FOREIGN PATENT DOCUMENTS

| | | |
|---|---|---|
| EP | 0 227 423 | 7/1987 |
| KR | 100 651 245 | 11/2006 |
| WO | 95/29140 | 11/1995 |
| WO | 01/54077 | 7/2001 |
| WO | 2007/131833 | 11/2007 |

* cited by examiner a)   b)

a)   b)

a) b)

OPTICALLY VARIABLE ENTITY AUTHENTICATING DEVICE AND METHOD

FIELD OF THE INVENTION

The present invention is related to the field of security document authentication. In particular, it is directed to a simple device and a method for authenticating an optically variable entity, which exhibits a color shift if the viewing-angle changes.

STATE OF THE ART

A simple viewing device and a method for simultaneously ascertaining the different colors of an optically variable entity under two different viewing angles has been disclosed in U.S. Pat. No. 5,596,402 A (Markantes et al.). The device essentially uses a mirror to simultaneously allow a direct viewing of the optically variable entity under a first viewing angle and an indirect viewing of the same entity via the mirror under a second viewing angle. Authentication of the optically variable entity is performed by comparing the two colors perceived with two reference colors.

This device of the prior art has the shortcoming of requiring a comparison of the colors of the optically variable entity under two different perspectives, i.e. the two images to be compared have not the same size along one direction.

A further shortcoming of this device is its rather large volume requirement to accommodate for the optical paths related to the direct and indirect viewing described above.

Another shortcoming of this device of the prior art is that it is restricted to human use and does not lend itself to an easy machine authentication.

SUMMARY OF THE INVENTION

The above-mentioned problems associated with the prior art are overcome by the present invention, which provides a device, a corresponding method, and the use of said device, each for authenticating an optically variable entity, according to the corresponding attached independent claims.

Particularly, the device for the authentication of an optically variable entity exhibiting a color shift with changing viewing-angle comprises a plate of light-refractive material, said plate having two surfaces and an array of light-refracting protrusions or recesses on at least one of said surfaces, and being disposed in said device such as to provide, aside each other, a direct view and a view through said plate onto at least parts of said optically variable entity, said view through said plate being an angularly deflected view, resulting from light refraction at said protrusions or recesses.

Accordingly, for authenticating an optically variable entity, its colors must be assessed for at least two different viewing angles, preferably a first viewing angle about orthogonal to the entity's surface, and a second viewing angle being an oblique angle to said surface. To see the optically variable entity simultaneously under both said viewing angles, part of the light from the optically variable entity must be deflected from said oblique to said orthogonal angle. According to the prior art, said deflection can be brought about by a mirror or by a prism, requiring optical paths of corresponding lengths. In the present invention, a flat array of protrusions or recesses in a plate of light-refracting material is used to produce said deflection from oblique to orthogonal angle.

For practical reasons, the plate is preferably a planar plate having two macroscopically parallel surfaces. The light-refracting protrusions respectively recesses on the surface of said plate serve to obtain a deflection of orthogonally incident light away from orthogonal direction. Examples of such protrusions or recesses are 1-dimensional or 2-dimensional arrays of micro-prisms or 1-dimensional or 2-dimensional lenticular arrays. Whereas micro-prisms refract light of orthogonal incidence at their faces into determined discrete directions other than orthogonal, lenses refract light of orthogonal incidence into a continuum of directions other than orthogonal. Both embodiments are useful to obtain a specific "angular view", or some kind of averaged "angular view" onto the optically variable entity in the context of the present invention.

Further embodiments and advantages of the invention are provided by the dependent claims.

BRIEF DESCRIPTION OF THE DRAWINGS

FIGS. 5a-5b illustrate 1-dimensionally embossed plates according to embodiments of the present invention, wherein FIG. 5a shows a symmetric "roof structure" and FIG. 5b shows an asymmetric "roof structure";

FIGS. 6a-6b illustrate 2-dimensionally embossed plates according to embodiments of the present invention, wherein FIG. 6a shows an array of square prisms and FIG. 6b shows an array of triangular prisms;

FIGS. 7a-7b illustrate lenticular array plates according to embodiments of the present invention, wherein FIG. 7a shows a 1-dimensional lenticular array and FIG. 7b shows a 2-dimensional lenticular array;

DETAILED DESCRIPTION OF THE INVENTION

Figure 1:
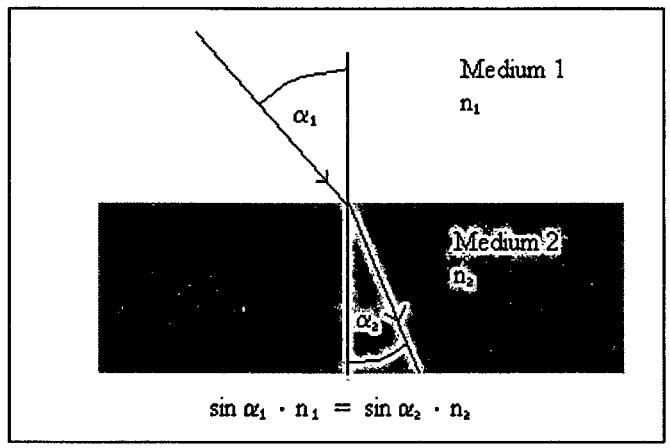
FIG. 1 exemplifies Snellius' law of refraction.

The present invention is based on the principle of optical refraction. With reference to FIG. 1, a light beam crossing the border surface between a first medium having a first refraction index $n_1$, and a second medium having a second refraction index $n_2$, changes its direction of propagation according to Snellius' law of refraction: $n_1 * \sin(\alpha_1) = n_2 * \sin(\alpha_2)$; the angles $\alpha_1$, $\alpha_2$ of the light beam in the first and in the second medium, respectively, being measured against the orthogonal direction to said border surface.

Figure 2:
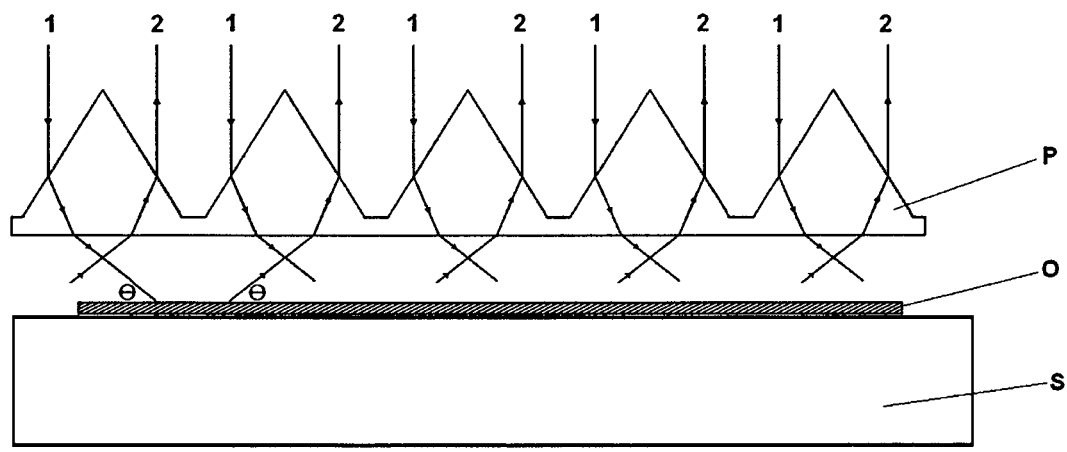
FIG. 2 schematically depicts the working principle of the present invention.

FIG. 2 illustrates how Snellius' law of refraction is exploited in an exemplary embodiment of the present invention to obtain, from an orthogonal viewing position, an angular view onto an optically variable entity O disposed on a substrate S). The prism plate P refracts light rays 1, incident at P at an orthogonal angle of 90° with respect to the surface of the optically variable entity O, such as to fall onto said optically variable entity O under an incident angle θ smaller than 90°. Similarly, light rays 2 reflected from said optically variable entity O at an angle θ against the surface of the optically variable entity O being smaller than 90°, are reoriented by said prism plate P to a direction orthogonal to the surface of the optically variable entity.

Figure 3:
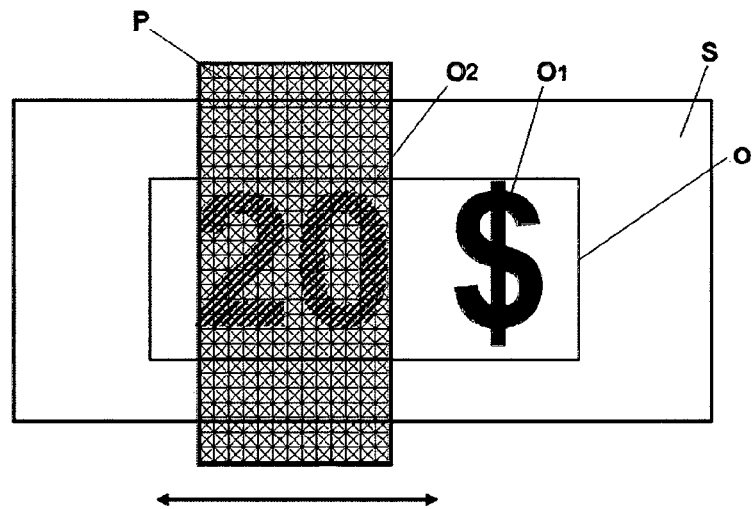
FIG. 3 schematically shows an authenticating device according to the present invention for the visual authenticating of an optically variable entity.

FIG. 3 illustrates a first principal embodiment of an authenticating device according to the present invention for the visual authentication with the otherwise unaided eye of an optically variable entity O having two portions O1 and O2 and being disposed on a substrate S. The authenticating device comprises a plate P having an array of micro-prisms on its surface, and disposed closely over the optically variable entity O, in such a way as to allow for its relative movement with respect to said optically variable entity O. The observer, i.e. the authenticating person, looking at the optically variable entity at about orthogonal view, can now judge, and if needed, compare with reference colors, a first color of the optically variable entity O as seen under orthogonal view, i.e. at its portion O1 and at an angle of 90° against the surface of the substrate, in the absence of said plate P, and a second color of the optically variable entity O as seen through said plate P at its portion O2 and under said view angle θ being smaller than 90°.

In a preferred embodiment, the plate having the array of light-refracting protrusions or recesses on its surface can be embodied as a positively embossed (for protrusions) respectively negatively embossed (for recesses) polycarbonate (PC) plastic plate. Polycarbonate has a refractive index n in the range of 1.58 to 1.60. Other thermoplastic polymers having a refractive index in the range of 1.50 to 1.80, in particular polyetheretherketone (PEEK), polysulfone (PSU), polyethylenenaphtalate polyester (PEN), polyethyleneterephtalate (PET), polystyrene (PS), polyvinylchloride (PVC), polyamide (PA), polyehtlylene (PE), polyurethane (PUR), polypropylene (PP), as well as the various acrylic polymers, can also be used, as long as they are transparent in the visible spectral range from 400 nm to 700 nm. The thermoplastic polymer can also be a composite material comprising one of said organic polymers or a mixture thereof, together with a refractive-index-increasing inorganic nanoparticulate material, such as nanocrystalline $TiO_2$, having a refractive index of 2.0 or higher and a particle size below 50 nanometers in order to prevent light scattering effects at the individual particles.

The thermoplastic polymer can be formed, i.e. embossed, above its glass-transition temperature. The glass-transition temperature (Tg) is known to the skilled person as the temperature above which the thermoplastic polymer changes from a quasi-solid (rigid) to a quasi-liquid (moldable) state. The required surface texture of protrusions or recesses, such as an array of micro-prisms, can thus be formed, i.e. embossed, into the thermoplastic plate, for example with the help of a hot roller carrying a master texture on its surface. Useful glass transition temperatures for embossing lie generally above 60° C., preferably above 80° C. Polycarbonate (PC, "Lexan", "Macrolon") has a glass transition temperature Tg of 150° C., whereas PET has a Tg of about 70° C. and PVC a Tg of about 80° C.

Figure 9:
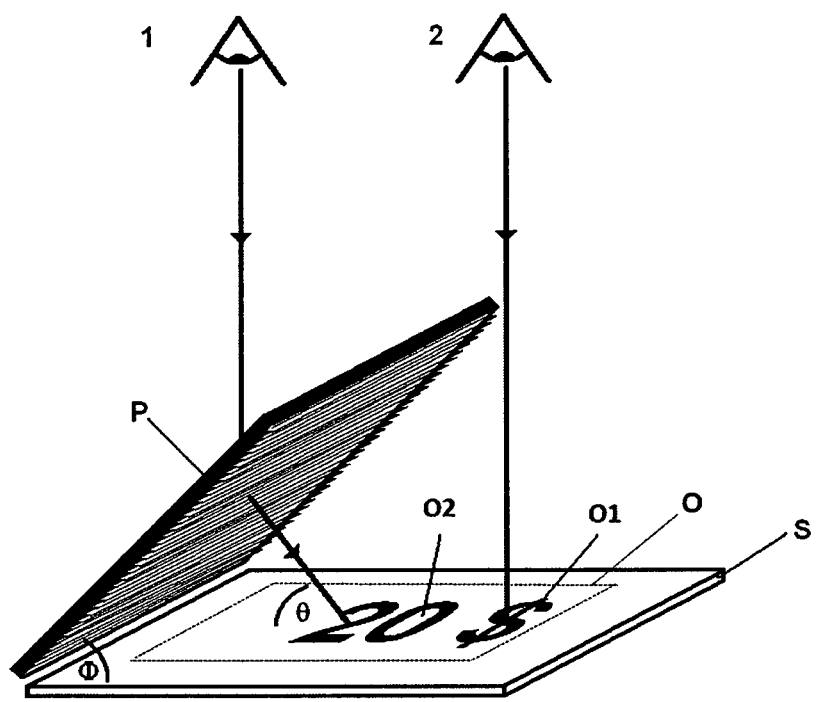
FIG. 9 schematically shows an alternative authenticating device according to the present invention for the visual authenticating of an optically variable entity.

An alternative variant of this embodiment is illustrated in FIG. 9. The authenticating device for the visual authentication of optically variable entity O on a substrate S according to this embodiment comprises a plate P having an array of micro-prisms on its surface, the plate being disposed at an inclination angle Φ with respect to the optically variable entity O. The observer, i.e. the authenticating person, looking at the optically variable entity at about orthogonal view, can now judge, and if needed compare with reference colors, a first color of the optically variable entity as seen from view point 2 under orthogonal view (i.e. at the portion O1 of the optical variable entity O and at an angle of 90° against the surface of the substrate S) in the absence of said plate P, and a second color of the optically variable entity as seen from view point 1 through said plate P at the portion O2 of the optical variable entity O and at under said viewing angle θ being smaller than 90°. Most useful values for the inclination angle Φ between the plate P and the surface of the substrate S are in the range of between 0° and 60°. The "open" embodiment with an inclined plate P allows for an illumination of the optically variable entity O not only through the plate but in addition, under specular conditions, from the side without the illuminating light first having to pass through the plate before reaching the optically variable entity and illuminating it. This provides the advantage of having a maximum intensity of the illuminating light directly on the optically variable entity, which enhances the perception, by a user of the authenticating device, of the optical effects on which the authentication of the optically variable entity relies and thus ensures an even more reliable and a quicker authentication without the need for the user to first apply more optimal illumination conditions. Thus, for example the authentication can also occur in places having a poor illumination.

Figure 4:
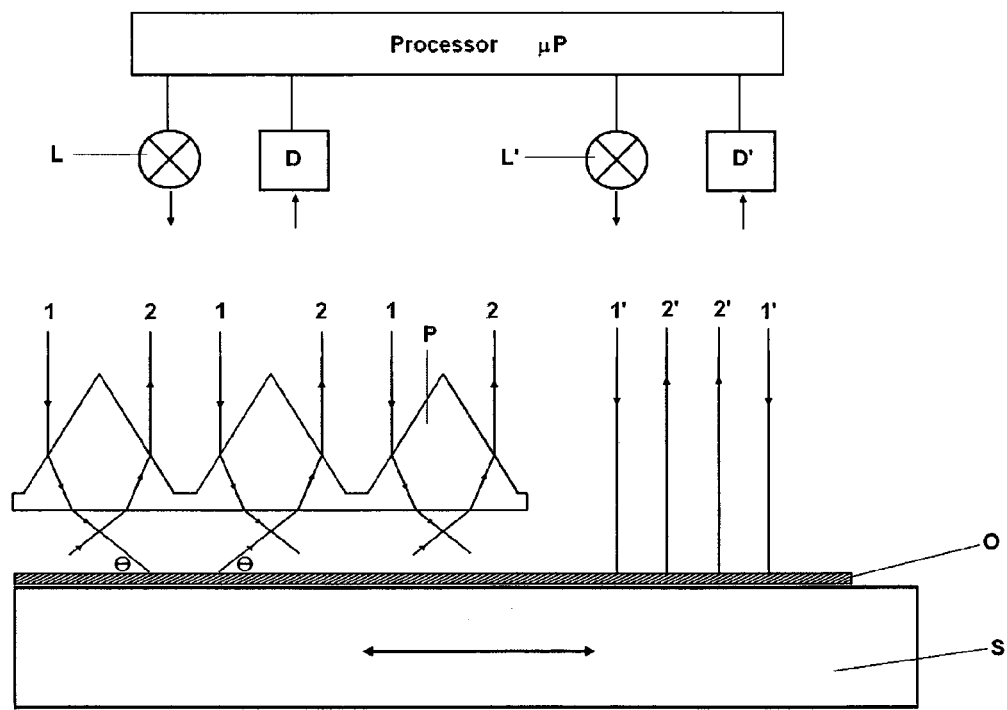
FIG. 4 schematically shows an authenticating device according to the present invention for authenticating an optically variable entity by a machine.

With reference to FIG. 4, a second principal embodiment of an authenticating device according to the present invention is disclosed. This authenticating device can be used for the machine authenticating, e.g. in an automated currency acceptor, of an optically variable entity O on a substrate S. The authenticating device according to this embodiment comprises a first light source L disposed such as to illuminate said optically variable entity O at about orthogonal incidence through a plate P having an array of micro-prisms on its surface, said plate P being disposed closely above the optically variable entity O; a first light detector D disposed such as to receive light from said optically variable entity O at about orthogonal incidence through said plate P; a second light source L' disposed such as to directly illuminate said optically variable entity O at about orthogonal incidence; a second light detector D' disposed such as to directly receive light from said optically variable entity O at about orthogonal incidence. Light sources L, L' and light detectors D, D' are connected to a processor µP enabled with memory and one or more programs to carry out the authenticating operation.

In a variant of this embodiment, a single light source L may serve as the illumination source for both, the illumination through said plate P and the direct illumination of the optically variable entity O.

Similarly, in a further variant of this embodiment, a single light detector D may serve to receive light reflected from said optically variable entity O through said plate P, and to receive light directly reflected from said optically variable entity O.

According to a further variant of this embodiment, it is possible to embody a sequential assessment of the light reflected through said plate P and the light directly reflected, using a single light source L and a single light detector D, by, e.g., moving said plate P forth and back.

Preferably, at least one of the one or more light sources L, L' is a broad-band emitter, such as an incandescent light source or a white LED.

Further, preferable at least one of the one or more light detectors D, D' is a red-green-blue (RGB) color sensor, such as are used to assess a color in the CIE 1976 (CIELAB) color space of human perception.

Alternatively, at least one of the one or more light detectors D, D' can be a more extended spectral sensor, embodied e.g. by a micro-spectrometer which delivers a plurality of wavelength/intensity values in the wavelength domain of human perception (400 nm to 700 nm). In a variant of this embodiment, said one or more light sensors deliver a plurality of wavelength/intensity values in the extended optical wavelength domain of 200 nm to 2,500 nm.

In still another variant of this embodiment, at least one of said one or more light detectors D, D' is a broadband light intensity detector, and at least one of said one or more light sources L, L' is a spectrally variable light source. In a first subvariant of this variant, at least one of the one or more light sources comprises a red, a green, and a blue LED, which are switched on and off in sequence, and the one or more light detectors corresponding to this at least one light source are broadband silicon photocells. In this way a color comparable to the CIE 1976 (CIELAB) color space of human perception can be assessed by measuring the reflected light intensities under red, green, and blue illumination. In a second subvariant of this variant, at least one of the one or more light sources comprises LEDs emitting at other wavelength than those corresponding to RGB, including outside the visible spectrum, in the UV and/or in the IR spectral range in the optical wavelength domain of 200 nm to 2,500 nm, and the corresponding one or more light detectors are selected such as to be sensitive to the light emitted by said LEDs, in order to measure the relative reflected light intensities for each of them.

Said optically variable entity O on its substrate S may be movably disposed with respect to the authenticating device comprising plate P, the one or more light sources L, L', the one or more light detectors D, D' and the processor μP, such as to enable the authenticating device to scan said optically variable entity O on its substrate S. Such scanning can be performed either manually, by drawing the optically variable entity through the authenticating device, or with the help of an electric conveyor; this latter option is the preferred one in case of an automated currency acceptor.

Figure 5:
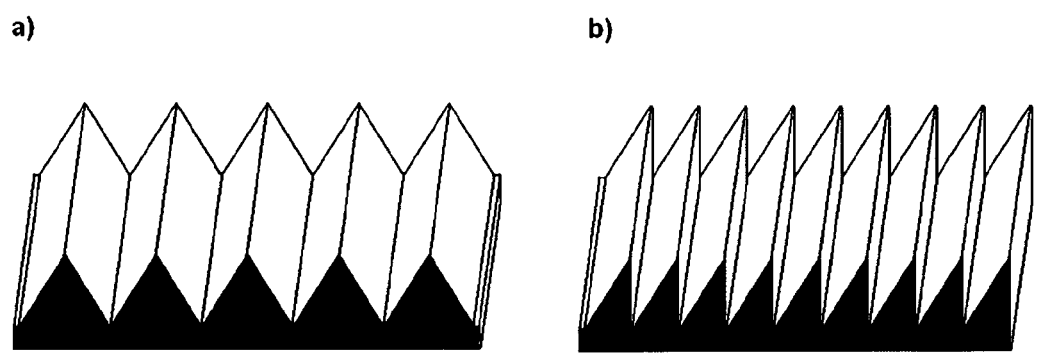

Said plate of light-refractive material carries positive or negative light-refracting embossings on at least one of its surfaces. Said embossings may take the form of a 1-dimensional symmetric "roof" structure, such as shown in FIG. 5a; or a 1-dimensional asymmetric "roof" structure, such as shown in FIG. 5b.

Figure 6:
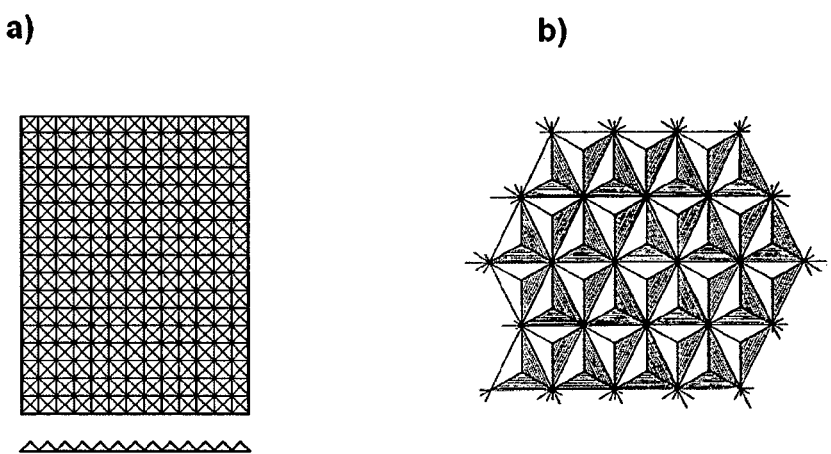

Alternatively the plate has a 2-dimensional texture, such as the array of square prisms shown in FIG. 6a, or the array of triangular prisms shown in FIG. 6b. Whereas a 1-dimensional light-refracting structure of the plate deflects light in one direction from or to orthogonal incidence to the plate, a 2-dimensional texture deflects light in more than one direction from of to orthogonal incidence to the plate. Both features can be advantageously exploited in particular embodiments. Particularly, the one-dimensional texture is preferred for the embodiment of FIG. 9, whereas the two-dimensional texture provides an improved specular illumination in the embodiments of FIGS. 2 and 8.

Figure 7:
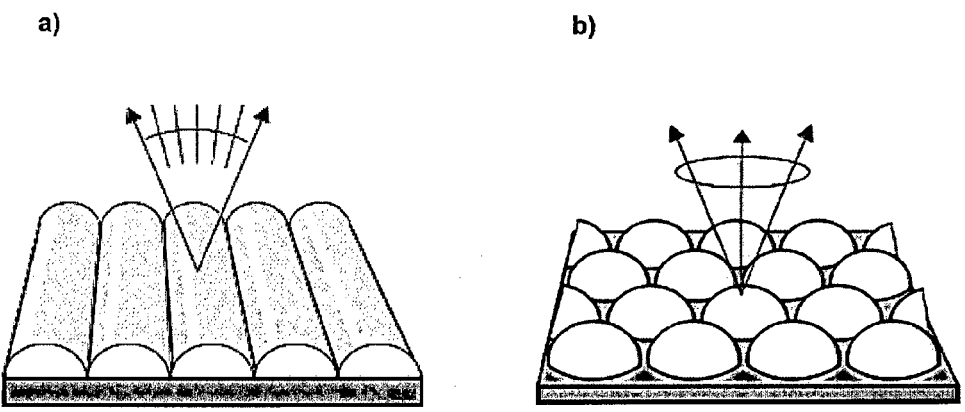

The present invention, however, is not limited to embossings with geometric figures having planar surfaces. other suitable structures with non-planar surfaces, such as for example a 1-dimensional lenticular array, e.g such as shown in FIG. 7a, or a 2-dimensional lenticular array, e.g. such as shown in FIG. 7b, are also suitable to embody the plate of light-refractive material required to practice the present invention.

Figure 8:
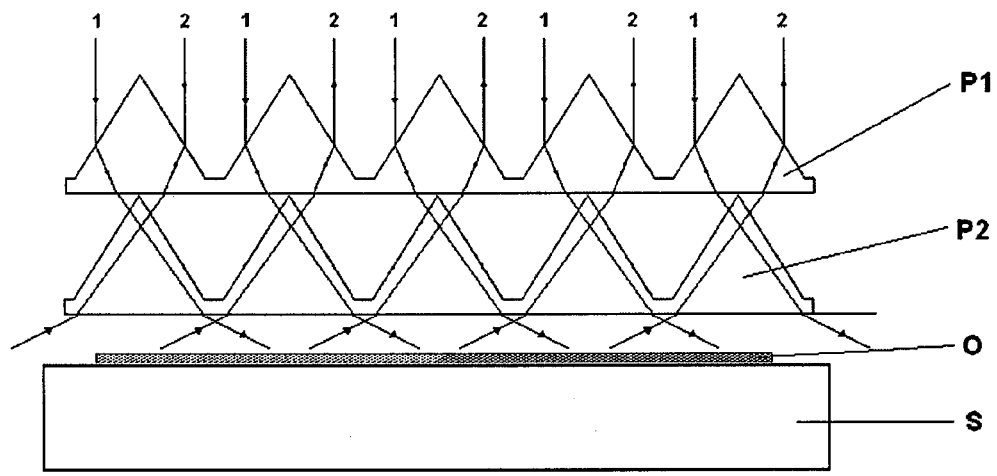
FIG. 8 schematically depicts the use of two stacked array plates to increase the angular deflection.

Further, the invention is not limited to the use of a single plate of light-refractive material. With reference to FIG. 8, two or more such plates P1, P2 can be combined, i.e. stacked on top of each other, in order to obtain a stronger deflection of the orthogonally incident light beams, and thus to probe the color of the optically variable entity O on its substrate S at a lower viewing angle.

In a further aspect of the present invention a method for authenticating an optically variable entity exhibiting a color shift with changing viewing-angle is disclosed, the method comprising the step of disposing a plate of light-refractive material on the optically variable entity, said plate having two surfaces and an array of light-refracting protrusions or recesses on at least one of said surfaces, such as to provide, aside each other, a direct view and a view through said plate onto at least parts of said optically variable entity, said view through said plate being an angularly deflected view, resulting from light refraction at said protrusions or recesses.

The optically variable entity is preferably authenticated by comparing its colors in direct view and in angularly deflected view through said plate with corresponding reference colors.

In another embodiment of the method, the colors of the optically variable entity in direct view and in angularly deflected view are assessed by the means of an automated device, comprising light sources L, L', light detectors D, D'), and a processor μP enabled with memory and one or more programs to carry out the authenticating operation. Again, as described above in relation to the second principal embodiment of the authenticating device according to the present invention, also a single light source and/or a single light detector may be used.

Finally, in another aspect of the present invention the use of a plate of light-refractive material for authenticating an optically variable entity is disclosed, said plate having two surfaces and an array of light-refracting protrusions or recesses on at least one of said surfaces, such as to provide, aside each other, a direct view and a view through said plate onto at least parts of said optically variable entity, said view through said plate being an angularly deflected view, resulting from light refraction at said protrusions or recesses.

EXAMPLES

In the following, the present invention is further demonstrated using two selected examples for the authenticating device. These examples serve, however, for the sole purpose of further illustrating the invention and are by no means meant to limit the scope of the invention to these examples.

Example 1

A device according to FIG. 3, for the visual authentication of an optically variable printed feature on a security document, was constructed as follows: Two sheets of "Luminit Direction Tuning Film 20°"", a plastic film having the structure shown in FIG. 5b, which is obtainable from Luminit LLC, Torrance, Calif., were assembled together according to FIG. 8, such as to obtain a light-refracting plate yielding a total deflection of 40° from orthogonal incidence. The so obtained plate was mounted on a support structure such as to keep it rigid and straight, and to allow it's sliding over a banknote carrying said optically variable feature. By sliding the plate over the banknote, the colors of the optically variable feature at vertical incidence and at an incidence of 40° can be visually compared.

In an alternative embodiment of Example 1, schematically shown in FIG. 9, two sheets of "Luminit Direction Tuning Film 20°"" were assembled together according to FIG. 8, such as to obtain a light-refracting plate yielding a total deflection of 40° from orthogonal incidence. The plate was mounted at an inclination angle Φ of 45°, such as to allow a free illumination of the optically variable entity with ambient light from the side, i.e. by light that does not first have to pass through said plate before reaching and thus illuminating the optically variable entity.

Said optically variable printed feature can e.g. be obtained by printing an ink according to EP-A-0227423, U.S. Pat. No. 5,279,657, WO 95/29140 or WO 2007/131833; the ink comprising flake shaped thin film optical interference pigments according to U.S. Pat. No. 4,705,300; U.S. Pat. No. 4,705,356; U.S. Pat. No. 4,721,217 and the hereto related disclosure.

Example 2

A device according to FIG. 4, for the machine-authentication of an optically variable feature on a security document, was obtained from the device of Example 1 by adding a white LED (Roithner Laser Technik, Vienna B5-430-JD as a light source (L), an RGB color sensor (Hamamatsu S9702) as a light detector (D), and a microprocessor (Analog Devices ADuC812) enabled with memory and program to carry out the authenticating operation as a processing unit (µP).

The invention claimed is:

1. A device for machine authenticating of an optically variable entity on a substrate, the device comprising: a plate of fight-refractive material having an array of micro-prisms on its surface to provide, aside each other, a direct view and a view through said plate onto at least parts of said optically variable entity, said view through said plate being an angularly deflected view, resulting from fight refraction at said micro-prisms, at least one fight source capable to illuminate said optically variable entity directly and/or through said plate; at least one fight detector capable to receive fight reflected from said optically variable entity directly and through said plate, wherein said at least one fight source is disposed such as to illuminate said optically variable entity at about orthogonal incidence through said plate, and wherein the device further comprises a second fight source disposed such as to directly illuminate said optically variable entity at about orthogonal incidence.

2. The device according to claim 1, wherein said first light detector is disposed such as to receive light from said optically variable entity at about orthogonal incidence through said plate, and wherein the device further comprises a second light detector disposed such as to directly receive light from said optically variable entity at about orthogonal incidence.

3. The device according to claim 1, wherein at least one of said light sources is a broad-band emitter such as an incandescent light source or a white LED.

4. The device according to claim 1, wherein at least one of said light detectors is a red-green-blue color sensor.

5. The device according to claim 1, wherein at least one of said light detectors is an extended spectral sensor which delivers a plurality of wavelength/intensity values in the wavelength domain of 200 nm to 2,500 nm.

6. The device according to claim 1, wherein at least one of said light detectors is a broadband light intensity detector, and at least one of said light sources is a spectrally variable light source.

7. The device according to claim 6 wherein said spectrally variable light source comprises a red, a green and a blue LED capable to be switched on and off in sequence and wherein said broadband light intensity detector is a broadband silicon photocell.

8. The device according to claim 6, wherein said spectrally variable light source comprises LEDs emitting at wavelengths other than those corresponding to red, green and blue, in the wavelength domain of 200 nm to 2,500 nm.

9. The device according to claim 1, wherein said plate P of light-refractive material carries positive or negative light-refracting embossing in the form of a 1-dimensional structure or in the form of a 2-dimensional texture.

10. A method for authenticating an optically variable entity, exhibiting a color shift with changing viewing-angle, said method comprising:
    disposing a plate of light-refractive material on the optically variable entity, said plate having two surfaces and an array of light-refracting protrusions or recesses on at least one of said surfaces, such as to provide, aside each other, a direct view and a view through said plate onto at least parts of said optically variable entity, said view through said plate being an angularly deflected view, resulting from light refraction at said protrusions or recesses,
    wherein the colors of the optically variable entity in direct view and in angularly deflected view are assessed an automated device, comprising light sources, light detectors and a processor enabled with memory and program to carry out the authenticating operation.

11. The method according to claim 10, wherein said plate is disposed at an inclination angle with respect to said optically variable entity.

12. The method according to claim 10, wherein the optically variable entity is drawn through the automated device with the help of an electric conveyor.

* * * * *